INFRARED ABSORPTION SPECTRUM OF PRASINOMYCIN

INVENTORS
EDWARD MEYERS
RICHARD DONOVICK
FRANK L. WEISENBORN
FELIX E. PANSY

INFRARED ABSORPTION SPECTRUM OF PRASINOMYCIN B

INFRARED ABSORPTION SPECTRUM OF PRASINOMYCIN A

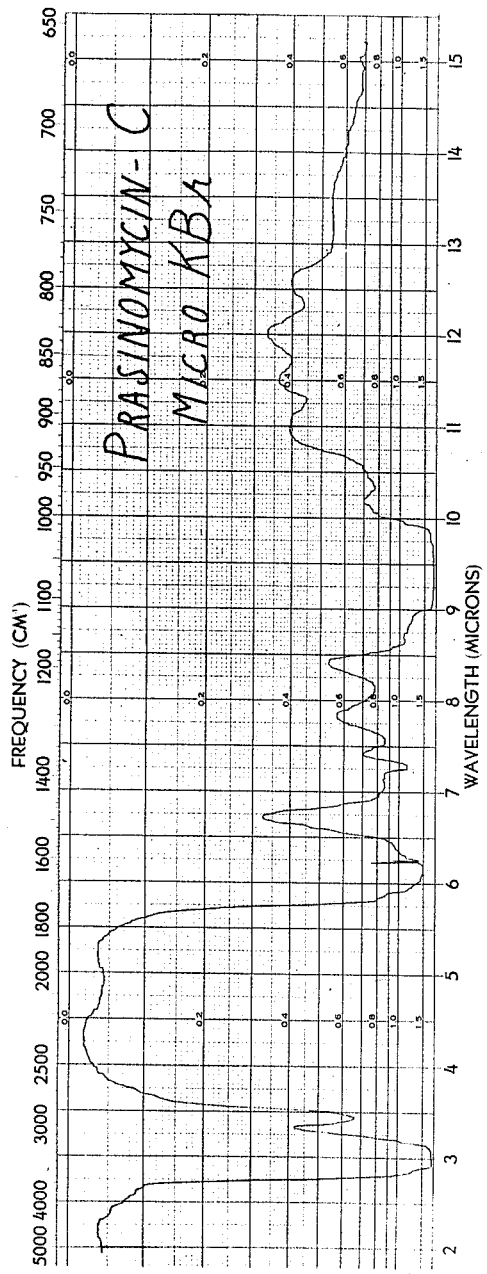
FIGURE 4  INFRARED ABSORPTION SPECTRUM OF PRASINOMYCIN C

നdoc# 3,493,653
PRASINOMYCIN

Edward Myers, East Brunswick, Richard Donovick, Green Brook, Frank Lee Weisenborn, Somerset, and Felix Edward Pansy, Jamesburg, N.J., assignors to E. R. Squibb & Sons, Inc., New York, N.Y., a corporation of Delaware Continuation-in-part of application Ser. No. 493,461, Oct. 6, 1965, which is a continuation-in-part of application Ser. No. 430,135, Feb. 3, 1965. This application Aug. 5, 1968, Ser. No. 769,770
Int. Cl. A61k 21/00
U.S. Cl. 424—118         8 Claims

ABSTRACT OF THE DISCLOSURE

This invention relates to new antibiotic substances and to a process for producing them. The novel antibiotic substances are designated generally by the name prasinomycin and individual components are designated by letter. Prasinomycin is produced by cultivation of species of Streptomyces, namely Streptomyces prasinus, Streptomyces hirsutus and Streptomyces prasino-pilosus. Prasinomycin and its components have broad activity against gram positive bacteria and limited activity against gram negative bacteria.

---

Figure 1:
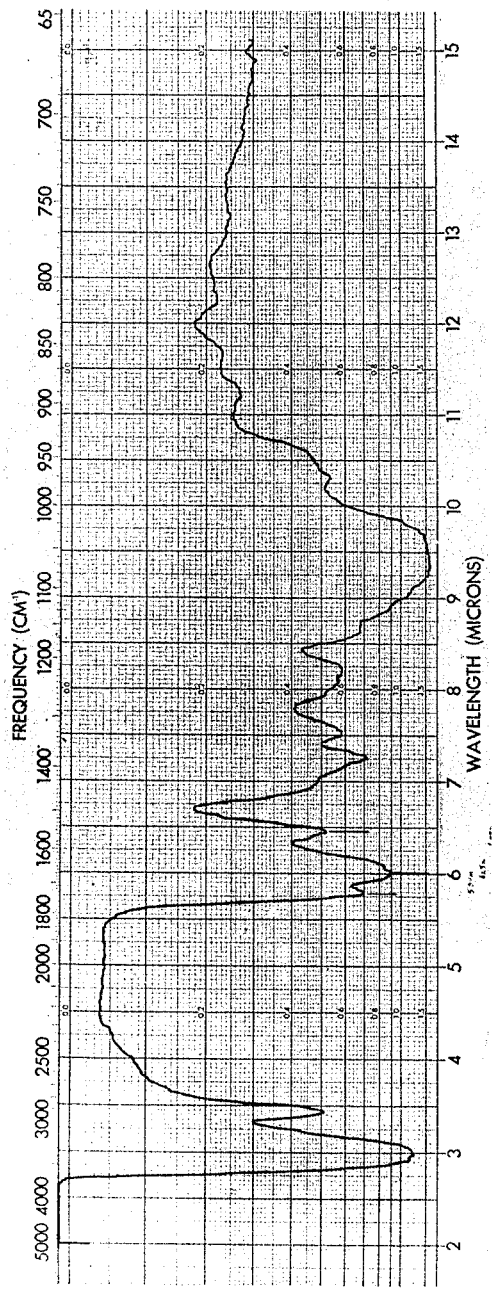

This application is a continuation-in-part of our application Ser. No. 493,461, filed Oct. 6, 1965 and now abandoned, which is in turn a continuation-in-part of our application, Ser. No. 430,135, filed Feb. 3, 1965, and now abandoned.

SUMMARY OF THE INVENTION

This invention relates to new antibiotic substances, methods for their production by fermentation and to methods for their concentration, purification and isolation.

The mixture of novel antibiotic substances of this invention are hereinafter designated generically and in mixture as prasinomycin, and the individual components as prasinomycin A, prasinomycin B, prasinomycin C, prasinomycin D and prasinomycin E. Prasinomycin is produced by the cultivation under controlled conditions of certain Streptomyces microorganisms. Among these are a strain of *Streptomyces prasinus* isolated from soil samples obtained in Colorado Springs, Colo. and deposited (without limitation on its availability) with the American Type Culture Collection in Rockville, Md. under the accession number 15,825, *Streptomyces hirsutus* ATCC 19,091 and *Streptomyces prasino-pilosus* ATCC 19,092.

The *Streptomyces prasinus* employable in the practice of this invention may be isolated and characterized by first shaking a portion of the soil sample in sterile distilled water and plating it on an agar medium containing the following materials:

|  | G. |
|---|---|
| Agar | 15 |
| Sucrose | 10 |
| Citric acid | 1.2 |
| $(NH_4)_2HPO_4$ | 0.4 |
| KCl | 0.08 |
| $MgCl_2 \cdot 6H_2O$ | 0.418 |
| $MnCl_2 \cdot 4H_2O$ | 0.036 |
| $FeCl_3 \cdot 6H_2O$ | 0.023 |
| $ZnCl_3 \cdot 6H_2O$ | 0.021 |
| $CoCl_2 \cdot 6H_2O$ | 0.004 |
| Distilled water to 1000 ml. | |

The medium is adjusted to pH 7.0 and sterilized in an autoclave at 121° C. for thirty minutes. After seven to ten days' incubation at 25° C., colonies of *Streptomyces prasinus* are isolated from the plated soil. These isolated colonies are then grown in a medium containing:

|  | G. |
|---|---|
| Beef extract | 1.5 |
| Yeast extract | 3.0 |
| Peptone | 6.0 |
| Dextrose | 1.0 |
| Distilled water to 1000 ml. | |

The medium is autoclaved at 121° C. for fifteen minutes. The organism is capable of utilizing the following carbon sources in a basal medium containing $(NH_4)_2SO_4$ as a source of nitrogen: glucose, mannitol, inositol, xylose, arabinose and fructose. Growth is not supported by sorbitol, rhamnose and lactose.

The organism is proteolytic on milk and gelatin, hydrolyzes starch, is $H_2S$ negative and does not reduce nitrate.

The following is a description of colonies of the microorganism incubated on various media:

Tomato paste-oatmeal agar, the aerial mycelium is leek green (ISCC–120). The reverse is sage brush green $M+P_{16}E_5$ (ISCC–156).

Yeast-malt extract agar, the aerial mycelium is leek green, the reverse is creamish yellow. No soluble pigments are produced.

Synthetic salt starch agar, the aerial mycelium is grass green, becoming dark grayish green with age, and the reverse is reddish-brown. No soluble pigments are produced.

The general characteristics of the microorganism are: green spore color, sporophores in hooks or primitive spirals and non-chromogenic on proteinaceous media. These characteristics place the organism in the viridus series V of Waksman.

Prasinomycin (and all of its components) possess broad activity against gram positive bacteria, for example, Staphylococcus, e.g., *S. aureus*, Streptococcus, e.g., *S. pyogenes*, *S. agalactiae*, Bacillus, e.g., *B. cereus*, *B. megaterium*, Micrococcus, e.g., *M. lysodeikticus*, and Mycobacterium, e.g., *M. tuberculosis*, and limited activity against gram negative bacteria, for example, Proteus, e.g., *P. vulgaris*, *P. mirabilis*, Neisseria, e.g., *N. catarrhalis*.

Thus prasinomycin or any of its individual components or an alkali salt of any of these, e.g., alkali metal salt, alkaline earth metal salt, or salt with an organic base, may be used, particularly parenterally in a conventional vehicle in an amount of about 1 to 10 mg./kg. in single or divided doses, 2 to 4 times daily to combat infections in animals due to gram positive or gram negative organisms such as those above. For example, 1.25 to 10 mg./kg. of prasinomycin or one of more of its components, may be administered subcutaneously as a protective dose to mice infected with *S. pyogenes*. These substances are also useful as animal feed supplement to promote weight gain, e.g., when added to a commercially available poultry ration in the range of about 0.1 mg. to 16.0 mg./kg. of diet.

In addition, these substances may be utilized in other manners as anti-bacterial agents, for example, in soap, or as disinfectants, e.g., for cleaning dairy equipment. An amount of about 0.1% to 5% on a weight basis, for example, dispersed in solid carriers or dissolved or suspended in aqueous media, may be used.

To form antibiotics, the desired organism is grown at 25° C. under submerged aerobic conditions in an aqueous nutrient medium containing an assimilable carbohydrate and nitrogen source. The fermentation is carried out for approximately 168 hours, at the end of which time the antibiotics have been formed.

After the fermentation is completed, prasinomycin is extracted from the mycelium with methanol, or, preferably from the whole fermentation broth, by first adjusting the broth to a pH of about 1.5 to 3.0 with hydrochloric acid, removing the total solids by filtration and extracting the filter cake with methanol.

The methanolic extracts are neutralized to pH 7 and concentrated in vacuo, leaving an aqueous suspension. The aqueous suspension is treated with a mineral acid to adjust the pH to 1.5, and is then extracted with chloroform or butanol. The organic phase may then be dried with anhydrous $Na_2SO_4$ and concentrated to a small volume. The concentrate is diluted with three to ten volumes of acetone, thereby precipitating the crude antibiotic.

The crude prasinomycin may be further purified by suspending it in distilled water and adjusting the pH to about 8.5 by addition of sodium hydroxide. The basic aqueous solution is extracted with n-butanol to remove neutral material. The aqueous phase is acidified to pH 1.5 with HCl and extracted with n-butanol. The butanol extract is concentrated under vacuum to give a dark brown amorphous product.

The crude prasinomycin is preferably purified by suspending it in ten times its weight of distilled water and adjusting the pH to about 8.5 by addition of sodium hydroxide. The basic aqueous solution is washed with n-butanol to remove neutral material. The aqueous phase is adjusted to pH 5 and again washed with n-butanol. The aqueous phase is adjusetd to pH 1.5–2.0 and extracted with n-butanol. The butanol extract is neutralized with sodium hydroxide and the mixture evaporated to dryness. The free acid is obtained and the sodium ions removed by contacting an aqueous solution of the sodium salt with a strong acidic ion exchange resin, e.g., Dowex 50 in the $H^+$ form.

Separation of the five components of the antibiotic mixture is effected by counter current distribution in an atmosphere of nitrogen or by partition paper chromatography as shown below.

The invention may be further illustrated by the following examples:

EXAMPLE 1

Tomato paste-oatmeal agar slants are seeded with *Streptomyces prasinus* (ATCC 15,825). They are incubated for seven to ten days and then used to inoculate 100 ml. of aqueous soybean meal medium contained in 500 ml. Erlenmeyer flasks. The composition of the germination medium is:

| | | |
|---|---|---|
| Soybeam meal (Staley's nutrient) | g-- | 15 |
| Dehydrate mashed potato | g-- | 15 |
| Glucose | g-- | 50 |
| $CoCl_2 \cdot 2H_2O$ (10 ml. of a 0.05% solution). | | |
| $CaCO_3$ | g-- | 10 |
| Agar | g-- | 2.5 |
| Distilled water | liter-- | 1 |

The medium is sterilized for twenty minutes at 121° C. and at fifteen pounds steam pressure. The germination flasks are incubated at 25° C. for seventy-two to ninety-six hours on a rotary shaker.

A 10% transfer is made from the germination flask to 500 ml. Erlenmeyer flasks containing 100 ml. of the following medium:

| | | |
|---|---|---|
| A.D.M. soybean meal | g-- | 60 |
| Glucose | g-- | 50 |
| $CaCO_3$ | g-- | 10 |
| Distilled water | liter-- | 1 |

The fermentation flasks are incubated and agitated as are the germination flasks. Samples are taken at three, five and seven days. They are prepared by centrifuging off the mycelium, extracting the mycelium with a volume of methanol equal to that of the supernate and assaying by an agar diffusion method. The results are as follows.

| Hours: | Biological activity (diffusion units/ml.) |
|---|---|
| 72 | 16.8 |
| 120 | 26.2 |
| 168 | 42.5 |

The assay organism is *Staphylococcus aureus* 209P.

EXAMPLE 2

A 150 gallon batch of *Streptomyces prasinus* (ATCC 15,825) is fermented as follows:

(A) Inoculum preparation

Inoculum source: Culture of *Streptomyces prasinus* (ATCC 15,825) preserved by lyophilization in milk.

Medium:

| | | |
|---|---|---|
| Soybean meal | g-- | 15 |
| Dehydrated mashed potato | g-- | 15 |
| Glucose | g-- | 50 |
| $CoCl_2 \cdot 2H_2O$ (10 ml. of a 0.05% solution). | | |
| $CaCO_3$ | g-- | 10 |
| Agar | g-- | 2.5 |
| Distilled water | liter-- | 1 |

One hundred twenty-five ml. of the medium in a 500 ml. flask is incubated ninety-six hours at 25° C. on the rotary shaker. One hundred twenty-five ml. of the above culture is added to 1000 ml. of the above medium except that the agar is omitted in a 4000 ml. flask and is incubated for forty-eight hours at 25° C. on a reciprocating shaker. One thousand ml. of the resultant material is then added to sixty gallons of a medium of the following composition and is incubated for seventy-two hours:

Medium:

| | | |
|---|---|---|
| Soybean meal (Staley's) | g-- | 15 |
| Hy-starch | g-- | 15 |
| Cerelose | g-- | 55 |
| CaCO | g-- | 10 |
| $CoCl_2 \cdot 2H_2O$ | g-- | 0.005 |
| Distilled water | liter-- | 1 |

During incubation, the broth is aerated at the rate of one foot per minute superficial air velocity and agitated for the first twelve hours and three feet per minute superficial air velocity and agitated thereafter. Nine gallons of the resultant material is added to 150 gallons of a medium of the following composition and is incubated for 168 hours, accompanied by aeration and agitation:

Medium:

| | | |
|---|---|---|
| Soybean meal (A.D.M.) | g-- | 60 |
| Cerelose | g-- | 55 |
| $CaCO_3$ | g-- | 10 |
| Defoamer | percent-- | 0.05 |

The fermentation broth is acidified to pH 1.5–3.0 with hydrochloric acid, 6 kg. of filter aid (Hyflo) is added, and the total insoluble material removed by filtration.

EXAMPLE 3

Ten kilograms of the filter cake obtained in Example 2 is extracted twice with methanol, using 15 l. portions of methanol for one hour. The cake is filtered between extractions. The combined filtrate is adjusted to pH 6–7 with sodium hydroxide and the solution is concentrated in vacuo to remove the methanol, leaving an aqueous suspension of about one liter.

The aqueous suspension, obtained by concentration of the methanolic extract, is adjusted to pH 1.5 with HCl, and extracted three times with chloroform, using 0.25 volume of chloroform each time. The pH is determined after each extraction, and if necessary, is readjusted to pH 1.5. The pooled chloroform extracts are concentrated in vacuo to a heavy syrup.

Four liters of acetone are added to the heavy syrup obtained in Example 3, the mixture shaken for one hour and filtered. The cake is dried under vacuum at room temperature. From 555 g. of the heavy syrup, 61.1 grams of an acetone insoluble, tan, amorphous solid, activity 725 units/mg., are obtained.

EXAMPLE 4

Sixty grams of the acetone insoluble product obtained in Example 3 is ground to a fine powder with mortar and pestle, suspended in 3.2 liters of water (pH 3.4) and adjusted to pH 8.6 by addition of 2.5 N NaOH (25 ml.) with stirring. The remaining trace of insoluble material is ignored. The basic aqueous solution is extracted three times with 800 ml. portions of n-butanol. The resulting dark red aqueous phase is acidified to pH 2 with 5% HCl (82 ml.) and extracted three times with 800 ml. portions of n-butanol. The combined butanol extracts are concentrated under vacuum to give a dark brown amorphous acidic product, 29.0 grams, activity of 2,200 units/mg.

Further purification may be accomplished by counter-current distribution of the acidic fraction in the system, chloroform, methanol, water (5, 4, 2 v./v./v.). The active fraction is then distributed again with a solvent system of n-butanol, ethyl acetate, water (2, 1, 3 v./v./v.). The tubes containing the active fraction are combined, evaporated to dryness under vacuum, the residue dissolved in methanol, and the colorless product precipitated by the addition of ethyl acetate. Prasinomycin is obtained which is of the potency of 2,655 units/mg., M.P. (with decomposition) 164–165° C., and having the infrared spectrum as shown in FIGURE 1, with absorption maxima at 3.00, 3.45, 5.75, 6.00, 6.45, 7.55, 8.25, 9.50 and 10.30 microns.

The substance readily hydrates on exposure to air picking up 7.2% its weight of water which is lost on drying at 80° C. at 0.1 mm. pressure.

Analysis (hydrated form).—C, 46.18%; H, 7.17%; N, 4.05%; P, 2.37%; O, 40.23% (by difference).

Neutral equivalent by titration with sodium hydroxide =697.

Strong acid hydrolysis of prasinomycin liberates phosphoric acid and ninhydrin positive substances including D-glucosamine and 6-desoxy-D-glucosamine.

The material is negative when tested with ninhydrin or silver nitrate, but gives a blue color when treated with 2% t-butyl hypochlorite dissolved in cyclohexane followed by starch-potassium iodide solution.

EXAMPLE 5

Ten grams of the acetone insoluble power obtained by the procedure described in Example 3 is ground to a fine powder with mortar and pestle, suspended in 100 ml. of water (pH 3.4) and adjusted to pH 9 by addition of 2.5 N NaOH (4.3 ml.) with stirring. The remaining trace of insoluble material is ignored. The basic aqueous solution is extracted three times with 75 ml. portions of n-butanol. The resulting dark red aqueous phase is adjusted to pH 5 with 6 N HCl (0.35 ml.) and washed two times with 75 ml. portions of n-butanol. The aqueous phase is acidified to pH 1.5–2.0 with 6 N HCl (0.6 ml.) and extracted two times with 75 ml. portions of n-butanol. The combined butanol extracts from the last extraction are adjusted to pH 7 with NaOH and the mixture concentrated under vacuum to yield the amorphous sodium salt, 2 grams, activity of 3,440 $\mu$/mg.

To prepare the free acid, 1 gram of the sodium salt is dissolved in 25 ml. of distilled water and the acid liberated by the addition of a strongly acidic ion exchange resin, e.g., Dowex 50 in the H+ form, until the pH of the solution is approximately 2.5. The resin is filtered off and the free acid recovered from the aqueous filtrate by freeze drying. yielding 0.7 g. of a light tan powder, activity of 3,200 $\mu$/mg.

EXAMPLE 6

Two-fold tube dilution assays were done with several microorganisms. The prasinomycin used in this study is equivalent in purity to the acid fraction described in Example 4.

| Organism: | M.I.C. ($\mu$g./ml.) |
|---|---|
| Staphylococcus aureus 209P | 0.09 |
| Streptococcus pyogenes C203 | 0.24 |
| Streptococcus agalactiae | 0.25 |
| Salmonella schottmuelleri No. 3850 | $\geq$50.0 |
| Salmonella typhimurium No. 3821 | $\geq$50.0 |
| Pseudomonas aeruginosa No. 3840 | $\geq$50.0 |
| Proteus vulgaris No. 3855 | 25.0 |
| Proteus mirabilis No. 3873 | 18.7 |
| Candida albicans No. 1539 | $\geq$50.0 |
| Mycobacterium tuberculosis var. B.C.G. | 1.0 |
| Neisseria catarrhalis | 6.3 |

EXAMPLE 7

Mice are injected intraperitoneally with 1000 $LD_{50}$ doses of Streptococcus pyogenes C203, and five hours post infection are given the antibiotic mixture subcutaneously, with the following results:

TABLE 1

| Drug | Mg./Kg. | S/T[1] |
|---|---|---|
| Penicillin G | 2 | 2/10 |
|  | 1 | 3/10 |
|  | 0.5 | 1/10 |
| Prasinomycin | 10 | 10/10 |
|  | 5 | 6/10 |
|  | 2.5 | 8/10 |
|  | 1.25 | 4/10 |
| Untreated |  | 0/10 |

[1] Survivors/Total Mice Involved.

EXAMPLE 8

Metal salts of prasinomycin

Prasinomycin is suspended in water (30 mg./ml.). Barium hydroxide solution is added to pH 8 and the solution stirred to complete solution of the antibiotic. Five volumes of ethanol are added and the precipitate of barium salt filtered off and washed with ethanol. On exposure to air the salt hydrates to the extent of 9.7% its weight of water which is lost on drying at 80° at 0.1 mm. pressure.

Analysis (hydrated form).—C, 40.93%; H, 6.25%; Ba, 9.22%; P, 1.79%.

Neutral equivalent (perchloric acid titration)=647.

Similarly, following the procedure of Example 8, but substituting equivalent amounts of sodium hydroxide or potassium hydroxide for barium hydroxide, the respective sodium and potassium salts are obtained.

EXAMPLE 9

Following the procedure of Examples 2, 3 and 4, but substituting Streptomyces hirsutus (ATCC 19,091) for the Streptomyces prasinus in Example 2, there is obtained prasinomycin.

EXAMPLE 10

Following the procedures of Examples 2, 3 and 4, but substituting Streptomyces prasino-pilosus (ATCC 19,-092) for the Streptomyces prasinus in Example 2, there is obtained prasinomycin.

EXAMPLE 11

Prasinomycin A, prasinomycin B, prasinomycin C, prasinomycin D and prasinomycin E are isolated by counter-current distribution of the material obtained in Example 5, using the solvent system: n-propanol, n-butanol, 0.2 M N-ethylmorpholine (2:3:6 by volume). The acid (4.4 grams) is dissolved in 200 ml. of the lower phase, adjusted to pH 9 with N-ethylmorpholine, and subjected to 1500 transfers in a counter-current distribution apparatus in an atmosphere of nitrogen gas.

The material in the tubes corresponding to the individual active components are combined and solvent removed under vacuum. The resulting N-ethylmorpholine salts are taken up in water and the free acids liberated by treatment with the ion exchange resin Dowex 50 (H+ form). The resin is filtered off and the filtrate concentrated to dryness under vacuum. The residue is precipitated from methanol solution by the addition of ethyl acetate to yield the colorless, amorphous antibiotics. By this process 600 mg. of prasinomycin A, 506 mg. of prasinomycin B and 412 mg. of prasinomycin C are obtained.

The other components, prasinomycin D and E are resolved by partition paper chromatography and detected by bioautography using *S. aureus*. 0.1 μg. of the material obtained in Example 3 is spotted on doubly acid washed filter paper (e.g., Munktells No. S–302), 22 inches in length, and the filter paper sheet is dipped through a solution of acetone, lower phase of the solvent system (2:1 by volume). The sheet is air dried at room temperature (2–3 minutes) to remove the acetone, and is then developed with the upper phase of a solvent system consisting of n-butanol, pyridine, water (4:1:4 by volume) for 16 hours at room temperature. The solvents are removed by air drying and the sheet bioautographed on agar seeded with *Staphylococcus aureus* 209P. Prasinomycin A is characterized by an $R_f$ value of 0.23, prasinomycin B by $R_f$ 0.28, prasinomycin C by $R_f$ 0.36 and prasinomycin D by $R_f$ 0.38, and prasinomycin E by $R_f$ 0.45.

Salts of the prasinomycins are prepared by reacting the desired prasinomycin with the desired base. Any base may be used. Such bases include metal bases, such as the alkali metal hydroxides (e.g., sodium hydroxide and potassium hydroxide), and the alkaline earth metal hydroxides (e.g., barium hydroxide); and organic bases, such as primary, secondary and tertiary amines (e.g., diethylamine) and N-ethylmorpholine amine. The preparation of such salts is illustrated by the following example.

EXAMPLE 12

The sodium salts of the prasinomycins are prepared by suspending the desired prasinomycin (in the form of its free acid) in water and adding a 0.5 N aqueous solution of sodium hydroxide until a pH of 8 is achieved. The mixture is then stirred and five volumes of ethanol are added to precipitate the sodium salt. The precipitate is filtered off and washed with ethanol.

The elementary analyses of prasinomycin A, prasinomycin B and prasinomycin C, when measured as anhydrous free acids, are given in the following table, together with their neutral equivalents, obtained by titration with sodium hydroxide in water:

TABLE 2

| Compound | Found, Percent | | | | | Neutral Equiv. |
| --- | --- | --- | --- | --- | --- | --- |
| | C | H | N | P | N-OAc | |
| Prasinomycin A | 48.52 | 6.51 | 4.42 | 2.43 | 6.52 | 460 |
| Prasinomycin B | 50.72 | 6.70 | 4.76 | 2.30 | 6.33 | 430 |
| Prasinomycin C | 51.36 | 7.53 | 4.34 | 2.28 | 6.31 | 646 |

Figure 3:
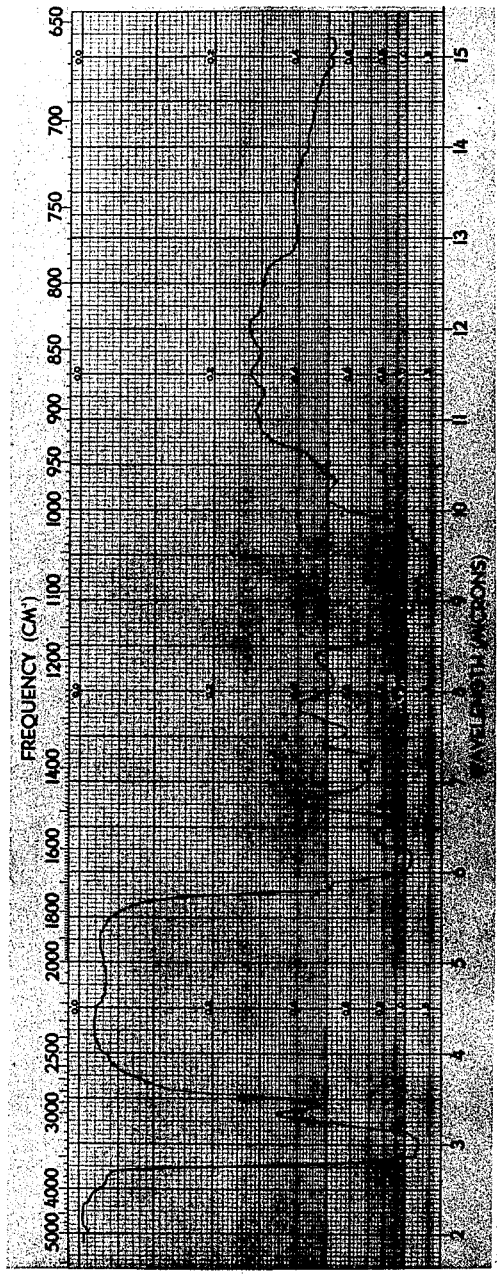
Figure 2:
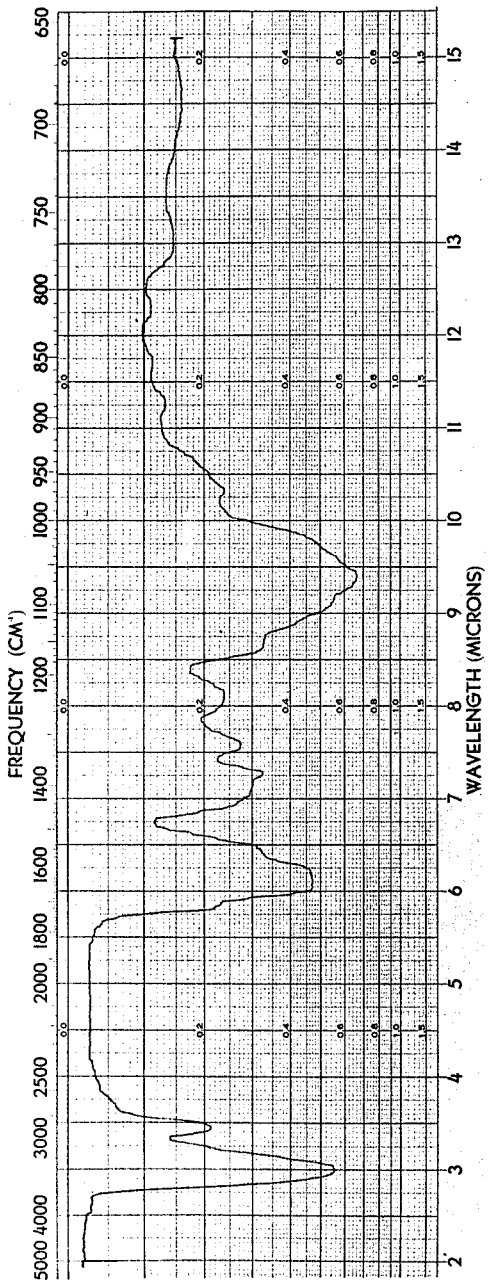

Other physical properties of the prasinomycins are given in the following table. The infrared spectra were obtained on the sodium salt of the indicated prasinomycin in KBr pellets:

As shown in FIGURE 2, prasinomycin A shows absorption maxima at 3.00, 3.45, 6.15, 7.25, 7.60, 8.20, 9.40 and 10.30 microns. As shown in FIGURE 3, prasinomycin B shows absorption maxima at 3.00, 3.45, 6.20, 6.55, 7.05, 7.30, 7.55, 8.20, 9.40 and 10.30 microns. As shown in FIGURE 4, prasinomycin C shows absorption maxima at 3.00, 3.45, 6.20, 7.30, 7.55, 8.20, 9.50 and 10.30 microns.

The in vitro spectrum of the prasinomycins, as determined by a two fold tube dilution assay are given in the following table:

TABLE 4

| Organism | M.I.C. (μg./ml.) Prasinomycin | | |
| --- | --- | --- | --- |
| | A | B | C |
| Staphylococcus aureus 209P | 0.24 | 0.32 | 0.12 |
| Staphylococcus aureus SC3184 [1] | 0.24 | 0.32 | 0.24 |
| Staphylococcus aureus SC2406 [2] | 0.47 | 0.47 | 0.24 |
| Bacillus cereus | 0.07 | 0.03 | 0.02 |
| Bacillus megaterium | 0.19 | 0.19 | 0.04 |
| Streptococcus pyogenes C203 | 0.42 | 0.28 | 0.14 |
| Streptococcus sp. SC3966 | 0.004 | 0.003 | 0.003 |
| Micrococcus lysodeikticus | 0.17 | 0.17 | 0.08 |
| Pseudomonas aeruginosa | >50 | >50 | >50 |
| Saccharomyces cerevisiae | >100 | >100 | >100 |
| Candida albicans | >100 | >100 | >100 |
| Aspergillus niger | >100 | >100 | >100 |

[1] Resistant to penicillin, streptomycin, tetracycline, 5-hydroxytetracycline, 7-chlorotetracycline, erythromycin, oleandomycin.
[2] Resistant to penicillin, streptomycin, neomycin, methymycin.

What is claimed is:

1. A substance effective in inhibiting the growth of gram positive bacteria selected from the group consisting of prasinomycin and salts thereof, said prasinomycin in its hydrated form having the following approximate elementary analysis: C, 46.18%; H, 7.17%; N, 4.05%; and P, 2.37%; a neutral equivalent against sodium hydroxide about 697; and having an infrared absorption spectrum as shown in FIGURE 1.

2. A substance effective in inhibiting the growth of gram positive bacteria selected from the group consisting of prasinomycin A and salts thereof, said prasinomycin A having the following approximate elementary analysis: C, 48.52%; H, 6.51%; N, 4.42%; and P, 2.43%; an $R_f$ value about 0.23; a neutral equivalent against sodium hydroxide about 460; and in its sodium salt from having an infrared absorption spectrum as shown in FIGURE 2.

3. A substance effective in inhibiting the growth of gram positive bacteria selected from the group consisting of prasinomycin B and salts thereof, said prasinomycin B having the following approximate elementary analysis: C, 50.72%; H, 6.70%; N, 4.76%; and P, 2.30%; an $R_f$ value about 0.28; a neutral equivalent against sodium hydroxide about 430; and in its sodium salt form having an infrared absorption spectrum as shown in FIGURE 3.

4. A substance effective in inhibiting the growth of gram positive bacteria selected from the group consisting of prasinomycin C and salts thereof, said prasinomycin C having the following approximate elementary analysis: C, 51.36%; H, 7.53%; N, 4.34%; and P, 2.28%; an $R_f$ value about 0.36; a neutral equivalent against sodium hydroxide about 646; and in its sodium salt form having an infrared absorption spectrum as shown in FIGURE 4.

5. A process for producing prasinomycin as defined in claim 1, which comprises cultivating a microorganism selected from the group consisting of *Streptomyces prasinus* ATCC 15,825, *Streptomyces hirsutus* ATCC 19,091 and *Streptomyces prasino-pilosus* ATCC 19,092 in an aqueous nutrient medium under aerobic conditions until

TABLE 3

| Compound | H₂O [α]D (free acid), degrees | Ultraviolet, mμ (E1%), | | $R_f$ | | Distribution Coefficient [c] | Infrared Spectrum |
| --- | --- | --- | --- | --- | --- | --- | --- |
| | | 0.1 N-HCl | 0.1 N-KOH | I [a] | II [b] | | |
| Prasinomycin A | +.8 | 246 (6.0) | 256 (8.2) | .23 | .25 | .17 | Figure 2. |
| Prasinomycin B | +2.8 | 246 (42) | 257 (90) | .28 | .25 | .24 | Figure 3. |
| Prasinomycin C | +4.4 | 244 (7.2) | 257 (9.4) | .36 | .39 | .39 | Figure 4. |
| Prasinomycin D | | | | .38 | .39 | .43 | |
| Prasinomycin E | | | | .45 | .62 | .85 | |

[a] n-Butanol, pyridine, water (4:1:4 by volume).
[b] n-Propanol, n-butanol, 0.2 M N-ethylmorpholine (2:3:4 by volume).
[c] n-Propanol, n-butanol, 0.1 M N-ethylmorpholine (2:3:6 by volume). Counter-current distribution run in nitrogen atmosphere.

substantial antibiotic activity is imparted to said medium.

6. The process of claim 5, wherein the microorganism is *Streptomyces prasinus* ATCC 15,825.

7. The process of claim 5, wherein the microorganism is *Streptomyces hirsutus* ATCC 19,091.

8. The process of claim 5, wherein the microorganism is *Streptomyces prasino-pilosus* ATCC 19,092.

References Cited

UNITED STATES PATENTS 3,279,923  10/1966  Bauer et al. _____ 99—2

OTHER REFERENCES

Derwent Farmdoc: No. 23762, Sept. 21, 1965, pages 377–387.

Moenomycin: Antimicrobial Agents and Chemotherapy, 1965, 1966, pages 734–748.

ALBERT T. MEYERS, Primary Examiner

JEROME D. GOLDBERG, Assistant Examiner

U.S. Cl. X.R.

195—80